Dec. 24, 1940.　　　A. B. NEWTON　　　2,226,296

REFRIGERATION CONTROL SYSTEM

Filed July 24, 1939　　5 Sheets-Sheet 1

Inventor
Alwin B. Newton
George H. Fisher
Attorney

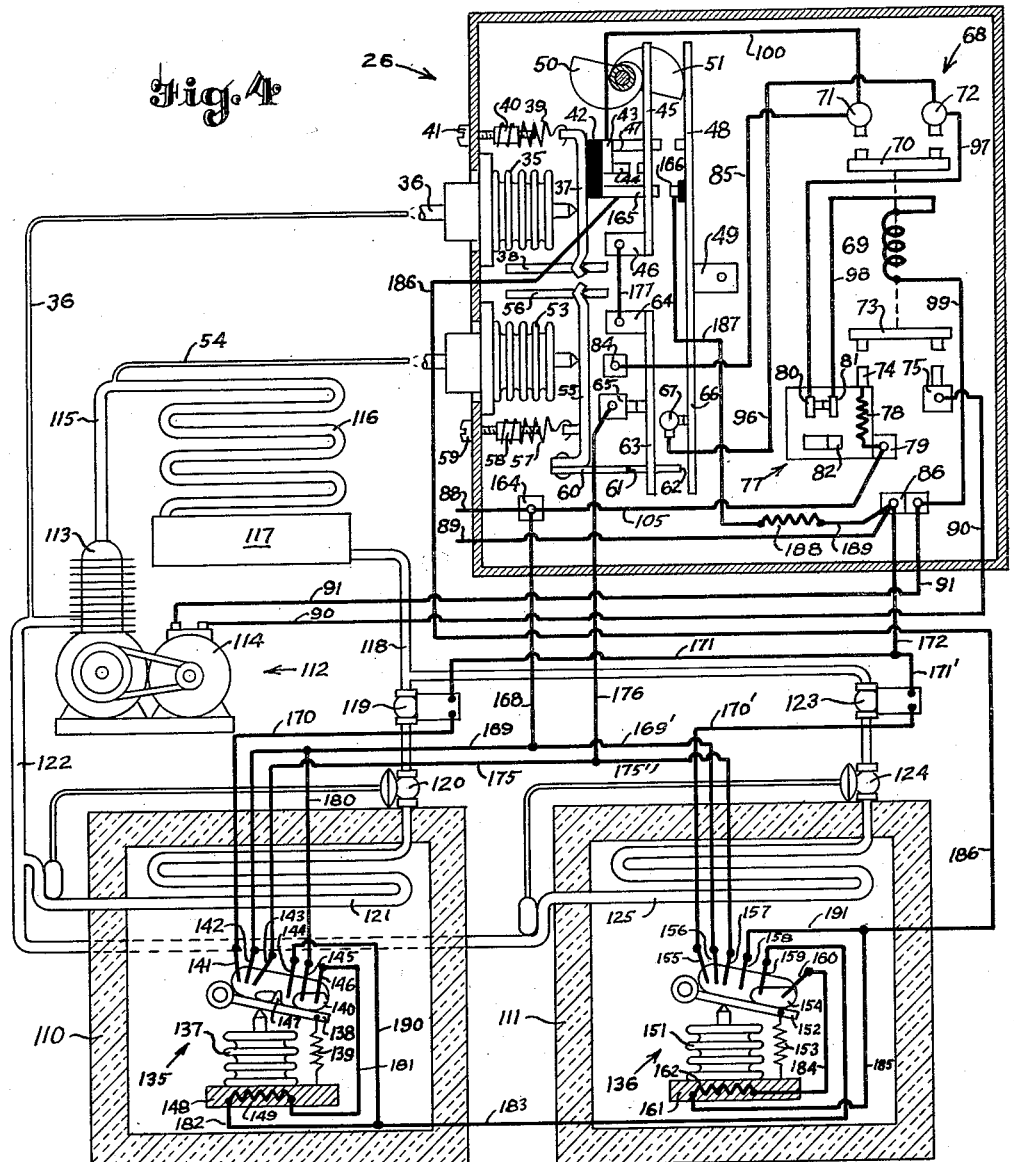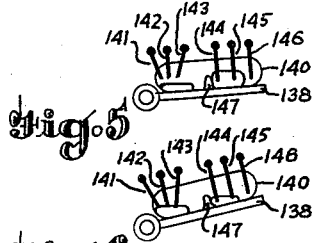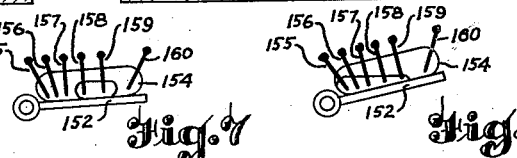

Dec. 24, 1940.   A. B. NEWTON   2,226,296
REFRIGERATION CONTROL SYSTEM
Filed July 24, 1939   5 Sheets-Sheet 3

Inventor
Alwin B. Newton
By George H Fisher
Attorney

Dec. 24, 1940.  A. B. NEWTON  2,226,296
REFRIGERATION CONTROL SYSTEM
Filed July 24, 1939  5 Sheets-Sheet 5

Inventor
Alwin B. Newton
By George H. Fisher
Attorney

Patented Dec. 24, 1940

2,226,296

UNITED STATES PATENT OFFICE 2,226,296

REFRIGERATION CONTROL SYSTEM

Alwin B. Newton, Minneapolis, Minn., assignor to Minneapolis-Honeywell Regulator Company, Minneapolis, Minn., a corporation of Delaware Application July 24, 1939, Serial No. 286,052

24 Claims. (Cl. 62—4)

This invention relates to control systems for a refrigerating apparatus for maintaining desired temperatures in a space or spaces and is a continuation in part of my application Serial No. 196,450 filed March 17, 1938.

An object of this invention is to provide a control system for a refrigerating apparatus having control means responsive to evaporator temperature and thermostatic control means responsive to the temperature of a medium being cooled by the refrigerating apparatus always to start circulation of refrigerant through the evaporator only when the evaporator temperature increases to a predetermined value regardless of whether the temperature of the medium being cooled by the evaporator means is above or below a predetermined value and after circulation of refrigerant has been started to continue circulation of refrigerant through the evaporator for an appreciable period of time or until the temperature of the medium being cooled by the evaporator decreases to said predetermined value.

An object of this invention is to provide a control system for a refrigerating apparatus having control means responsive to evaporator temperature and thermostatic control means responsive to a temperature condition being produced or controlled by the refrigerating apparatus wherein heat is supplied to the thermostatic control means under control of both control means to narrow the effective differential of operation of the thermostatic control means.

Another object of this invention is to provide a control system for a multiple fixture or space refrigerating apparatus having control means responsive to evaporator temperature and thermostatic control means responsive to the temperature of the fixtures or spaces, wherein the thermostatic control means control solenoid valves associated with each fixture or space, and wherein the compressor is controlled by both control means in such a manner that it is started when both the evaporator temperature rises to a predetermined value and the fixture or space temperature rise to predetermined values and it is continued in operation until either the fixture or space temperatures are restored to the desired values or the evaporator temperature decreases to a predetermined lower value.

Still another object of this invention is to provide a multiple fixture refrigerating apparatus control arrangement of the type specified above with a means for causing the thermostatic control means to cycle substantially together so that they will not keep the compressor operating continuously.

In carrying out this last object of the invention heat is supplied to the thermostatic control means for this purpose and accordingly a twofold improvement is provided, one, wherein the thermostatic control means cycle substantially together and, two, wherein the effective differential of operation of the thermostatic control means is materially reduced.

Other objects and advantages will become apparent to those skilled in the art upon reference to the accompanying specification, claims, and drawings in which:

Figure 4 is a diagrammatic illustration of another form of this invention as applied to a multiple fixture or space refrigerating apparatus;

Figures 5 and 6 are detailed views showing one of the switches of Figure 4 in various positions;

Figures 7 and 8 are detailed views showing another switch of Figure 4 in various positions;

Figure 1:
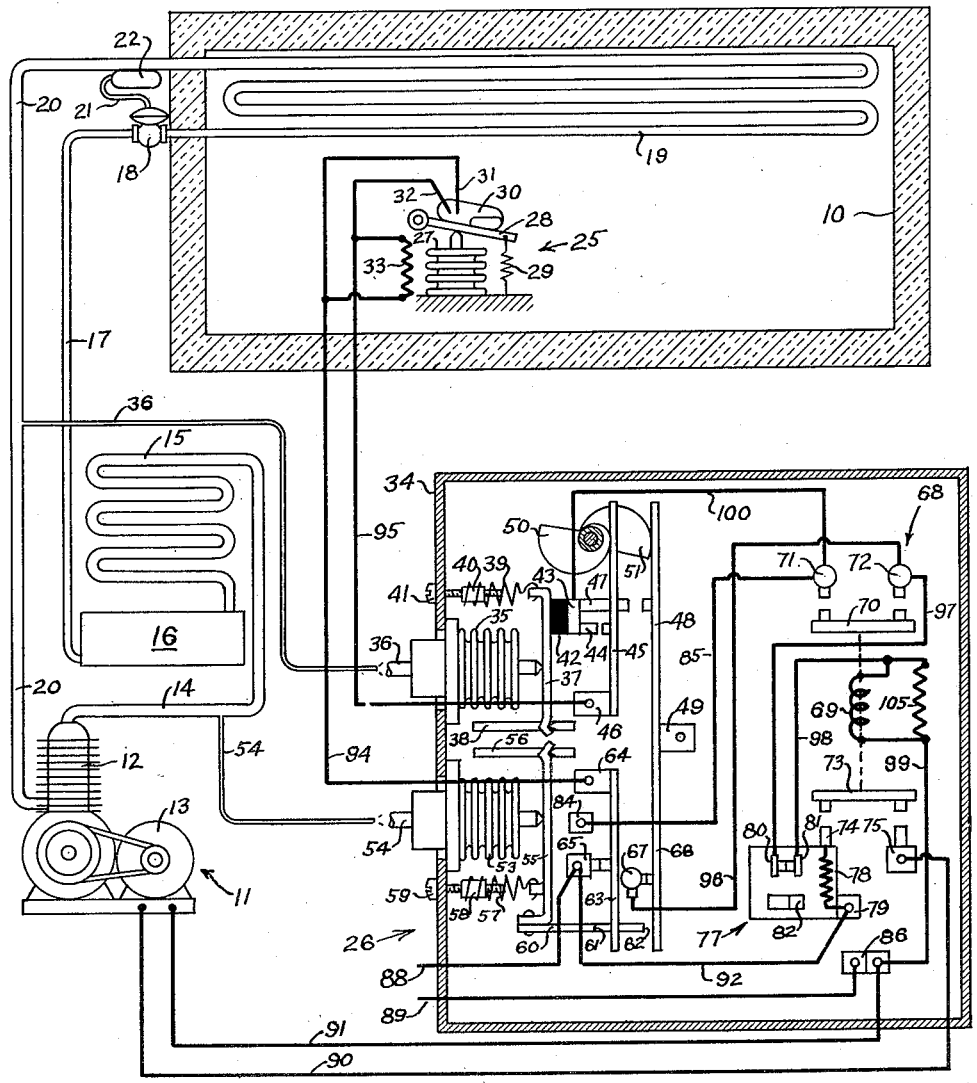
Figure 1 is a diagrammatic illustration of one form of this invention.

Referring now to Figure 1, a fixture or space the temperature of which is to be maintained within desired limits is illustrated at 10. The temperature of the fixture or space 10 is controlled by a mechanical refrigerating apparatus generally designated at 11. The refrigerating apparatus 11 may comprise a compressor 12 operated by a compressor motor 13. The compressor 12 delivers high pressure refrigerant through a high pressure line 14 into a condenser 15. The condenser 15 condenses this refrigerant and passes the condensed refrigerant to a receiver 16. Liquid refrigerant passes from the receiver 16 through a liquid line 17 and an expansion valve 18 into an evaporator 19 located within the fixture or space 10. Evaporated refrigerant is drawn from the evaporator 19 through a low pressure or suction line 20 by the compressor 12. The expansion valve 18 may be a thermostatic expansion valve as illustrated having a bulb 22 connected by a capillary tube 21 to the valve 18. The bulb 22 is located on the discharge side of the evaporator and preferably contains a volatile fluid. Such a refrigerating apparatus is old in the art and therefore a further description thereof is not considered necessary.

The refrigerating apparatus 11 is controlled by a thermostatic control means generally designated at 25 responsive to the temperature of the fixture or space 10 and by a unitary control arrangement generally designated at 26.

The thermostatic control means 25 may comprise a bellows 27 containing a volatile fluid for operating a lever 28 against the action of a tension spring 29. The lever 28 in turn operates a mercury switch 30 having electrodes 31 and 32. Upon an increase in temperature the mercury switch 30 is tilted to cause the electrodes to be bridged by the mercury of the switch 30. Upon a decrease in temperature the mercury disengages the electrodes 31 and 32. By adjusting the tension spring 29 the temperature setting of the thermostatic control means may be varied at will. A heater 33 is provided for locally heating the bellows 27 to provide a narrower effective differential of operation of the thermostatic control means 25 as will be pointed out more fully hereafter. For purposes of illustration it is assumed that the mercury switch 30 is closed when the temperature condition rises to 40° and is opened when the temperature condition decreases to 36°.

The unitary control arrangement generally designated at 26 may be of the type shown and described in application Serial No. 196,447 filed by Albert L. Judson and Carl G. Kronmiller on March 17, 1938. For purposes of illustration in this application the unitary control arrangement 26 is shown to comprise a base 34 upon which is mounted a bellows 35. The bellows 35 is connected by a pipe 36 to the low pressure or suction line 20 of the refrigerating apparatus. The bellows 35 operates a lever 37 pivoted on a fulcrum member 38 against the action of a tension spring 39. One end of the tension spring 39 is connected to the lever 37 and the other end is connected to a nut 40 screw threadedly mounted on a screw 41. By rotating the screw 41 the tension in the spring 39 is adjusted to calibrate the pressure setting of the bellows 35. The lever 37 carries an insulating pad 42 upon which is mounted a bridge member 43. The bridge member 43 carries a contact 44 which is adapted to engage a contact member 45 carried by a terminal 46. The bridge member 43 also carries a contact 47 adapted to engage a contact member 48 carried by a terminal 49. The contact members 45 and 48 are adjustably positioned by means of concentrically located cams 50 and 51. By rotating the cam 50 the position of the contact member 45 with respect to the contact member 44 may be varied and likewise by rotating the cam 51 the position of the contact member 48 may be varied with respect to the contact 47. For purposes of illustration it is assumed that the cams 50 and 51 are so positioned that upon an increase in suction pressure the contact 44 engages the contact member 45 at substantially 20 pounds and that the contact 47 engages the contact member 48 at substantially 40 pounds. Upon a decrease in pressure the contact 47 disengages the contact member 48 at 40 pounds and then the contact 44 disengages the contact member 45 at 20 pounds. It is assumed that when the pressure in the low pressure or suction line 20 rises to some value, say 38 pounds, that defrosting of the evaporator 19 occurs. Accordingly the contact 47 is not moved into engagement with the contact member 48 until low pressure or suction pressure is a direct indication of evaporator temperature then it may be said that the contacts 44 and 47 are operated in accordance with changes in evaporator temperature. If desired the bellows 35 could be connected by a capillary tube to a bulb located adjacent the evaporator 19, the bulb containing a volatile fluid so that the bellows 35 would be operated in direct accordance with evaporator temperature.

The unitary control arrangement 26 also includes a bellows 53 connected by a pipe 54 to the high pressure line 14 of the refrigerating apparatus. The bellows 53 operates a lever 55 fulcrumed on a fulcrum member 56 against the action of a tension spring 57. One end of the tension spring is connected to the lever 55 and the other end is connected to a nut 58 screw threadedly mounted on a screw 59. By rotating the screw 59 the tension in the spring 57 may be adjusted to adjust the pressure setting of the bellows 53. The lever 55 carries an adjustable abutment member 60 having abutments 61 and 62. The abutment 61 is adapted to engage a contact member 63 carried by a terminal 64. Contact member 63 engages a contact 65. The abutment 62 is adapted to engage a contact member 66 carried by the terminal 49. The contact member 66 engages a contact 67. For purposes of illustration it is assumed that upon an increase in pressure the abutment 62 first engages the contact member 66 to move the contact member 66 out of engagement with the contact 67 when the high pressure rises to 135 pounds and the abutment 61 engages the contact member 63 to move the contact member 63 out of engagement with the contact 65 when the high pressure rises to 185 pounds. Upon a decrease in pressure contact member 63 engages contact 65 at 185 pounds and the contact member 66 engages the contact 67 at 135 pounds.

The unitary control arrangement 26 also includes a relay or starter generally designated at 68. This relay or starter comprises an operating coil 69 for operating a bridge member 70 with respect to maintaining contacts 71 and 72 and a bridge member 73 with respect to load contacts 74 and 75. When the operating coil 69 is energized the bridge member 70 is moved into engagement with the contacts 71 and 72 and the bridge member 73 is moved into engagement with the contacts 74 and 75. When the operating coil 69 is deenergized the bridge members 70 and 73 are moved out of engagement with their respective contacts by means of springs, gravity or other means, not shown.

The unitary control arrangement 26 may also include an overload cut-out generally designated at 77. This overload cut-out may include a heater element 78 connected between a terminal 79 and the load contact 74 for heating a thermostatic element which trips open contacts 80 and 81 upon the occurrence of an overload condition. The contacts 80 and 81 may be manually reclosed by means of a reset arm 82.

The unitary control arrangement 26 may also include a control terminal 84 connected by a conductor 85 to the relay maintaining contact 71 and may also include a power terminal 86. Power is supplied to the unitary control arrangement 26 by means of line wires 88 and 89 leading from some source of power, not shown. The line wire 88 is connected to the contact 65 and the line wire 89 is connected to the power terminal 86. The compressor motor 13 is connected by wires 90 and 91 across the relay load contact 75 and the power terminal 86. The contact 65 is connected by a conductor 92 to the terminal 79 of the overload cut-out 77. The electrodes 31 and 32 of the thermostatic control means 25 are connected by wires 94 and 95 to the terminals 64 and 46, respectively. The contact 67 is connected by a conductor 96 to the relay maintaining contact 72 which in turn is connected by a conductor 97 to the contact 80 of the overload cut-out 77. The contact 81 is connected by a conductor 98 to the operating coil 69 which in turn is connected by a conductor 99 to the power terminal 86. The bridge member 43 is connected by a conductor 100 to the relay contact 71.

Assume the parts in the position shown in Figure 1, the high pressure is less than 135 pounds, the low pressure is less than 20 pounds, and the space or fixture temperature is less than 40°, hence the relay or starter 68 is dropped out and the compressor is not operating. Assume now that the low pressure rises to 40 pounds after defrosting of the evaporator 19 has occurred and that the fixture or space temperature rises to 40°. When this occurs a starting circuit is completed from the line wire 88 through contact 65, contact member 63, terminal 64, wire 94, electrodes 31 and 32, wire 95, terminal 46, contact member 45, contact 44, bridge member 43, contact 47, contact member 48, contact member 66, contact 67, conductor 96, contact 72, conductor 97, contacts 80 and 81 of the overload cut-out, conductor 98, operating coil 69, conductor 99, and power terminal 86 back to the other line wire 89. Completion of this starting circuit energizes the operating coil 69 to move the bridge member 70 into engagement with the maintaining contacts 71 and 72 and to move the bridge member 73 into engagement with the load contacts 74 and 75.

Movement of the bridge member 73 into engagement with the load contacts 74 and 75 completes a load circuit for the compressor motor 13 which may be traced as follows: line wire 88, contact 65, conductor 92, terminal 79, heater 78, contact 74, bridge member 73, contact 75, wire 90, compressor motor 13, wire 91, and power terminal 86 back to the other line wire 89. Completion of this load circuit causes operation of the refrigerating apparatus.

Movement of the bridge member 70 into engagement with maintaining contacts 71 and 72 completes a maintaining circuit for the operating coil 69 which is independent of the contact members 48 and 66 and this maintaining circuit may be traced from the line wire 88 through contact 65, contact member 63, terminal 64, wire 94, electrodes 31 and 32, wire 95, terminal 46, contact member 45, contact 44, bridge member 43, conductor 100, contact 71, bridge member 70, contact 72, conductor 97, contacts 80 and 81, conductor 98, operating coil 69, conductor 99, and power terminal 86 back to the other line wire 89. Completion of this maintaining circuit maintains the relay or starter energized and hence the refrigerating apparatus in operation until either the fixture or space temperature decreases to 36°, the low pressure decreases to 20 pounds or the high pressure increases to 185 pounds. After the compressor has been shut down upon the occurrence of any of these contingencies it cannot be again restarted until the high pressure decreases to 135 pounds, the low pressure increases to 40 pounds, and the fixture or space temperature increases to 40°. By reason of this control arrangement the space temperature is maintained within desired limits 36° to 40°, defrosting occurs every time that the operation of the refrigerating apparatus is stopped and the refrigerating apparatus cannot be restarted until the high pressure decreases to 135 pounds which insures that the compressor will not start against a heavy torque.

In order to reduce materially the operating differential of the thermostatic control means 25 and maintain the fixture temperature within narrower limits the heater 33 for locally heating the bellows 27 of the thermostatic control means is utilized. The heater is connected across the electrodes 31 and 32 of the thermostatic control means 25 so that when the terminals 31 and 32 are unbridged by the mercury the heater 33 is conditioned for heating the bellows 27 but when the electrodes 31 and 32 are bridged by the mercury this heater 33 is shorted out so that it does not heat the bellows 27. Since the heater 33 is connected in series with the terminals 64 and 46 of the unitary control arrangement it cannot be energized until the low pressure rises to 40 pounds and the high pressure decreases to 135 pounds. In other words, the heater 33 is not energized until defrosting of the evaporator 19 has been accomplished. After the evaporator 19 has been defrosted the heater 33 is energized to locally heat the bellows 27 of the thermostatic control means to cause it to assume the cut-in temperature of 40° before the fixture or space temperature rises materially. When the thermostatic control means assumes this cut-in temperature the heater 33 is shorted out so that the temperature of the thermostatic control means decreases quite rapidly to that of the ambient temperature within the fixture 10. The compressor is maintained in operation until the temperature of the thermostatic control means 25 decreases to the cut-out temperature of 36° or the low pressure decreases to 20 pounds or the high pressure increases to 185 pounds at which times the compressor is stopped. The cycle is then repeated in exactly the same manner as pointed out immediately above. Ordinarily the heater 33 is of such high resistance that it will not pull in the relay or starter 68 when it is energized. In order to insure that the relay or starter 68 will not pull in upon energization of the heater 33, a resistance 105 may be connected across the operating coil 69 of the relay or starter.

If the heating effect of the heater 33 is so selected that it is capable of supplying only 3 degrees of artificial heat to the bellows 27 of the thermostatic control means 25, then it will be impossible for the thermostatic control means to assume the 40° temperature value to close the mercury switch 30 until the temperature within the fixture 10 rises to 37°. In other words, if the amount of artificial heat supplied by the heater 33 is less than the differential of operation of the thermostatic control means, then the compressor cannot be started until the fixture temperature rises above the desired value of 36°. If on the other hand the heater 33 is so selected that it is capable of supplying more degrees of heat to the bellows 27 than the differential of operation of the thermostatic control means 25, that is more than 4 degrees of artificial heat, then the mercury switch 30 may be closed even though the fixture temperature is below 36°. For example, if 6 degrees of heat are supplied by the heater 33, then the compressor may be placed in operation when the fixture temperature is above 34°. With this latter arrangement it is seen that when the evaporator is defrosted, the compressor will be placed in operation even though the temperature within the fixture is below the desired value of 36° and will remain in operation for an appreciable period of time until the temperature of the thermostatic control means 25 decreases to 36°.

Figure 2:
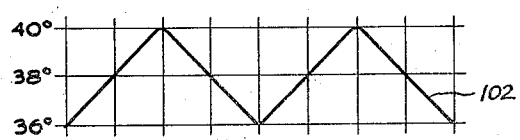
Figures 2 and 3 are graphs illustrating the mode of operation of Figure 1.
Figure 3:
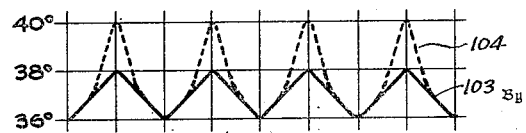

Referring now to Figure 2, curve 102 illustrates the fixture temperature under the above control arrangement when the thermostatic control means is not provided with the heater 33. Under these conditions it is seen that the fixture temperature varies within limits according to the actual differential setting of the thermostatic control means. Figure 3 shows the operation of the control arrangement with the heater 33 applied to the thermostatic control means. Here the curve 103 shown in solid lines indicates the actual fixture or space temperature while the curve 104 shown in broken lines illustrates the actual temperature of the thermostatic control means. Although the temperature of the thermostatic control means fluctuates between 36° and 40°, the temperature of the fixture fluctuates only between 36° and 38°. Accordingly it is seen that the heater 33 maintains the fixture temperature within much narrower limits and still allows for cyclic defrosting of the evaporator 19. By preventing energization of the heater 33 until defrosting of the evaporator 19 has actually occurred this defrosting action is insured even though the fixture or space temperature is maintained within relatively narrow limits.

Referring now to Figure 4 the control system of this invention is shown as applied to a multiple fixture or space cooling system wherein two fixtures or spaces are shown at 110 and 111. The temperature of these two fixtures is controlled by a single refrigerating apparatus generally designated at 112. This refrigerating apparatus may comprise a compressor 113 operated by a compressor motor 114, a high pressure line 115, a condenser 116, and a receiver 117. Liquid refrigerant is supplied from the receiver 117 through a liquid line 118, a solenoid valve 119, and an expansion valve 120 to an evaporator 121 located within the fixture 110. Expanded refrigerant is withdrawn from the evaporator 121 through a low pressure or suction line 122 by the compressor 113. The expansion valve 120 may be a thermostatic expansion valve as illustrated. In a like manner liquid refrigerant is supplied from receiver 117 through the liquid line 118, a solenoid valve 123, and an expansion valve 124 to an evaporator 125 located in the fixture 111. Expanded refrigerant is withdrawn from the evaporator 125 through the suction line 122 by the compressor 113. The expansion valve 124 may also be of the thermostatic expansion type as illustrated. The solenoid valve 119 for the fixture 110 is controlled by a thermostatic control means generally designated at 135 and the solenoid valve 123 for the fixture 111 is controlled by a thermostatic control means generally designated at 136. The compressor motor 114 is controlled by both thermostatic control means 135 and 136 and the unitary control arrangement 26.

The thermostatic control means 135 may comprise a bellows 137 for operating a lever 138 against the action of a tension spring 139. The lever 138 operates a mercury switch 140 having six electrodes 141 to 146, inclusive, which is also provided with a dam 147. The bellows 137 contains a volatile fluid and is intimately carried by a heat absorbing mass 148 in which is imbedded a heater 149. For purposes of illustration it is assumed that the mercury switch 140 assumes the position shown in Figure 4 when the temperature of the thermostatic control means is 36°. When the temperature of the thermostatic control means rises to 38° the mercury switch 140 assumes the position shown in Figure 5 and when the temperature of the thermostatic control means rises to 40° the mercury switch 140 assumes the position shown in Figure 6. Accordingly at 36° the electrodes 145 and 146 are bridged, at 38° the electrodes 144 and 145 are bridged, and at 40° the electrodes 141, 142, and 143 are bridged as well as electrodes 144 and 145.

The thermostatic control means 136 for the fixture or space 111 is shown to comprise a bellows 151 for operating a lever 152 against the action of a spring 153. The lever 152 operates a mercury switch 154 having six electrodes 155 to 160, inclusive. The bellows 151 is intimately supported by a heat absorbing mass 161 in which is imbedded a heater 162. For purposes of illustration it is assumed that when the temperature of the thermostatic control means 136 is 36° the electrodes 159 and 160 are bridged as in Figure 4. When the temperature rises to 38° the electrodes 158 and 159 are bridged as shown in Figure 7, and when the temperature rises to 40° the electrodes 155, 156, 157, 158, and 159 are bridged as shown in Figure 8. The electrodes 155, 156, 157, 158 and 160 are preferably made of a non-wetting material such as tungsten while the electrode 158 is made of a wetting material such as stainless steel with which the mercury in the switch amalgamates and tends to adhere. Hence, when the switch 154 is tilted to the position shown in Figure 7, the electrode 159 holds the mercury in the position shown until the switch is further tilted to the position shown in Figure 8.

The unitary control arrangement 26 is substantially the same as the unitary control arrangement of Figure 1 and accordingly like reference characters for like parts have been utilized. The unitary control arrangement 26 of Figure 4 differs slightly from that of Figure 1 in that it is provided with a power terminal 164, a contact 165 carried by the insulating pad 42 and a contact 166 insulatingly carried by the contact arm 48. Power is supplied to the unitary control arrangement by means of line wires 88 and 89 leading from some source of power, not shown, the line wire 88 being connected to the power terminal 164 and the line wire 189 being connected to the power terminal 86.

Assume now that the temperature of the thermostatic control means 135 rises to 40° to move the switch 140 to the position shown in Figure 6, the solenoid valve 119 associated with the fixture 110 is opened by means of a circuit which may be traced from the line wire 88 through power terminal 164, wire 168, wire 169, electrodes 142 and 141, wire 170, solenoid of the solenoid valve 119, wire 171, wire 172, and power terminal 86 back to the other line wire 89. Accordingly as the temperature of the thermostatic control means 135 rises to 40° the solenoid valve 119 is opened. In a like manner when the temperature of the thermostatic control means 136 of the fixture 111 rises to 40° to move the mercury switch 154 to the position shown in Figure 8, the solenoid valve 123 of that fixture is opened by means of a circuit which may be traced from the line wire 88, power terminal 164, wire 168, wire 169', electrodes 156 and 155, wire 170', solenoid valve 123, wire 171', wire 172, and power terminal 86 back to the other line wire 89. Hence upon a call for cooling by either thermostatic control means its associated solenoid valve is opened.

When the temperature of the thermostatic control means 135 of the fixture 110 rises to 40° to move the mercury switch 140 to the position shown in Figure 6 and when the evaporator coils 121 and 125 have been defrosted, the refrigerating apparatus is started by means of a starting circuit which may be traced from the line wire 88 through power terminal 164, wires 168 and 169, electrodes 142 and 143, wire 175, wire 176, contact 65, contact member 63, terminal 64, conductor 177, terminal 46, contact member 45, contact 44, bridge member 43, contact 47, contact member 48, contact member 66, contact 67, conductor 96, contact 72, conductor 97, contacts 80 and 81, conductor 98, operating coil 69, conductor 99, and power terminal 86 back to the line wire 89. Completion of this circuit pulls in the starter or relay 68 to operate the compressor motor 114 and to establish a maintaining circuit which is independent of the contact members 48 and 66. This maintaining circuit may be traced from the line wire 88 through power terminal 164, wires 168 and 169, electrodes 142 and 143, wires 175 and 176, contact 65, contact member 63, terminal 64, conductor 177, terminal 46, contact member 45, contact 44, bridge member 43, conductor 100, contact 71, bridge member 70, contact 72, conductor 97, contacts 80 and 81, conductor 98, operating coil 69, conductor 99, and power terminal 86 back to the other line wire 89. In exactly the same manner the thermostatic control means 136 may start operation of the compressor 114 and maintain the compressor motor 114 in operation until the temperature of the thermostatic control means 136 decreases to the cut-out value. The electrodes 156 and 157 of the thermostatic control means 136 are connected in parallel with electrodes 142 and 143 of the thermostatic control means 135 by means of wires 169' and 175'.

Accordingly when either thermostatic control means 135 or 136 calls for cooling they open their respective solenoid valves 119 and 123 and place the compressor motor 114 in operation provided the low pressure has risen to 40 pounds as a result of defrosting of the evaporators 121 and 125 and the high pressure has decreased to 135 pounds. The solenoid valves will remain open until the temperature of their associated thermostatic control means decreases to cut-out temperature and the compressor motor 114 will remain in operation until both of the thermostatic control means 135 and 136 have decreased to their cut-out temperatures or until the suction pressure decreases to 20 pounds or until the high pressure rises to 185 pounds.

When a relatively large number of fixtures or spaces are being controlled in the above outlined manner it is quite possible that at least one thermostatic control means will be calling for cooling at all times. If such be the case then the compressor 113 will remain in operation and defrosting of the evaporators will not be accomplished until sufficient frost has been built up on them to cause the suction pressure to decrease to 20 pounds or until the high pressure increases to 185 pounds. It is therefore desirable to have the thermostatic control means cycle substantially together so that they will call for cooling and become satisfied at substantially the same time, whereby there will not be a continuous call for cooling by the thermostatic control means and the compressor 113 can be shut down to allow defrosting of all of the evaporators. This means for causing the thermostatic control means to cycle substantially together is accomplished by the heaters 149 and 162 imbedded in the heat absorbing masses 148 and 161, respectively.

Assume now that a cycle of operation has been completed and that defrosting of the evaporators 121 and 125 has just occurred the suction pressure will then rise to 40 pounds to move the contacts 47 and 165 into engagement with the contact member 48 and the contact 166, respectively. As a result a circuit is completed from the line wire 88 through power terminal 164, wires 168 and 169, wire 180, electrodes 145 and 146, wire 181, heater element 149, wire 182, wire 183, electrodes 159 and 160, wire 184, heater element 162, wire 185, wire 186, contact 165, contact 166, wire 187, resistance 188, wire 189, and power terminal 86 back to the other line wire 89. Completion of this circuit energizes both heaters 149 and 162 to supply heat to the heat absorbing masses 148 and 161, respectively. It is here pointed out that the two heater elements 149 and 162 are connected in series so that the total amount of heat supplied to the thermostatic control means is divided between them. This heat supplied to the masses 148 and 161 is stored up therein and begins to affect the bellows 137 and 151 of the thermostatic control means 135 and 136, respectively. As a result the switch 140 of the thermostatic control means 135 may be moved from the position shown in Figure 4 to the position shown in Figure 5 wherein the electrode 146 is unbridged. This breaks the connection to the heater 149 but since the electrode 144 is at this time bridged the circuit to the heater 162 of the thermostatic control means is completed through the electrode 144 and a wire 190. Under these conditions the temperature of the thermostatic control means has risen to 38° whereupon the heater 149 associated therewith is rendered inoperative. This rendering inoperative of the heater 149 causes the heater 162 to receive the full supply of heat to heat at a greater rate the mass 161 of the thermostatic control means 136. When the temperature of the thermostatic control means 136 rises to 38° to position the switch 154 in the position shown in Figure 7 the electrode 160 is unbridged to interrupt the supply of heat to the heater 162 but the circuit is maintained completed by the bridging of the electrode 158 and by wire 191. The resistance 188 included in this last mentioned completed circuit is provided for the purpose of preventing a direct short across the line wires 88 and 89.

It may be that the thermostatic control means 136 will assume the temperature of 38° before the thermostatic control means 135 assumes this temperature but the operation is exactly the same and therefore a further description is not considered necessary. As a result of the heating of the masses 148 and 161 in the manner pointed out above this heat absorbed by these masses will be transferred to the bellows 137 and 151 of the thermostatic control means 135 and 136 to cause the temperature thereof to rise to 40° at substantially the same time whereupon the respective solenoid valves are opened and the compressor 113 is placed in operation in the manner pointed out above. The solenoid valves will remain open until their respective thermostatic control means decrease in temperature to the cut-out point and the compressor 113 will remain in operation until all of the thermostatic control means are satisfied or until the low pressure decreases to 20 pounds or until the high pressure increases to 185 pounds.

In this manner the thermostatic control means of the various fixtures are caused to cycle substantially together so that they will all call for cooling at substantially the same time. Accordingly they will tend to become satisfied during the same time interval and therefore the compressor will be shut down to allow defrosting of all of the evaporator coils. In addition to the thermostatic control means will operate through a relatively narrow effective differential to maintain the temperatures in the fixtures within narrower limits in the manner pointed out above in connection with Figures 1, 2, and 3. Although two fixtures have been shown for purposes of illustration, any number of fixtures may be utilized and the action will be substantially the same.

Figure 9:
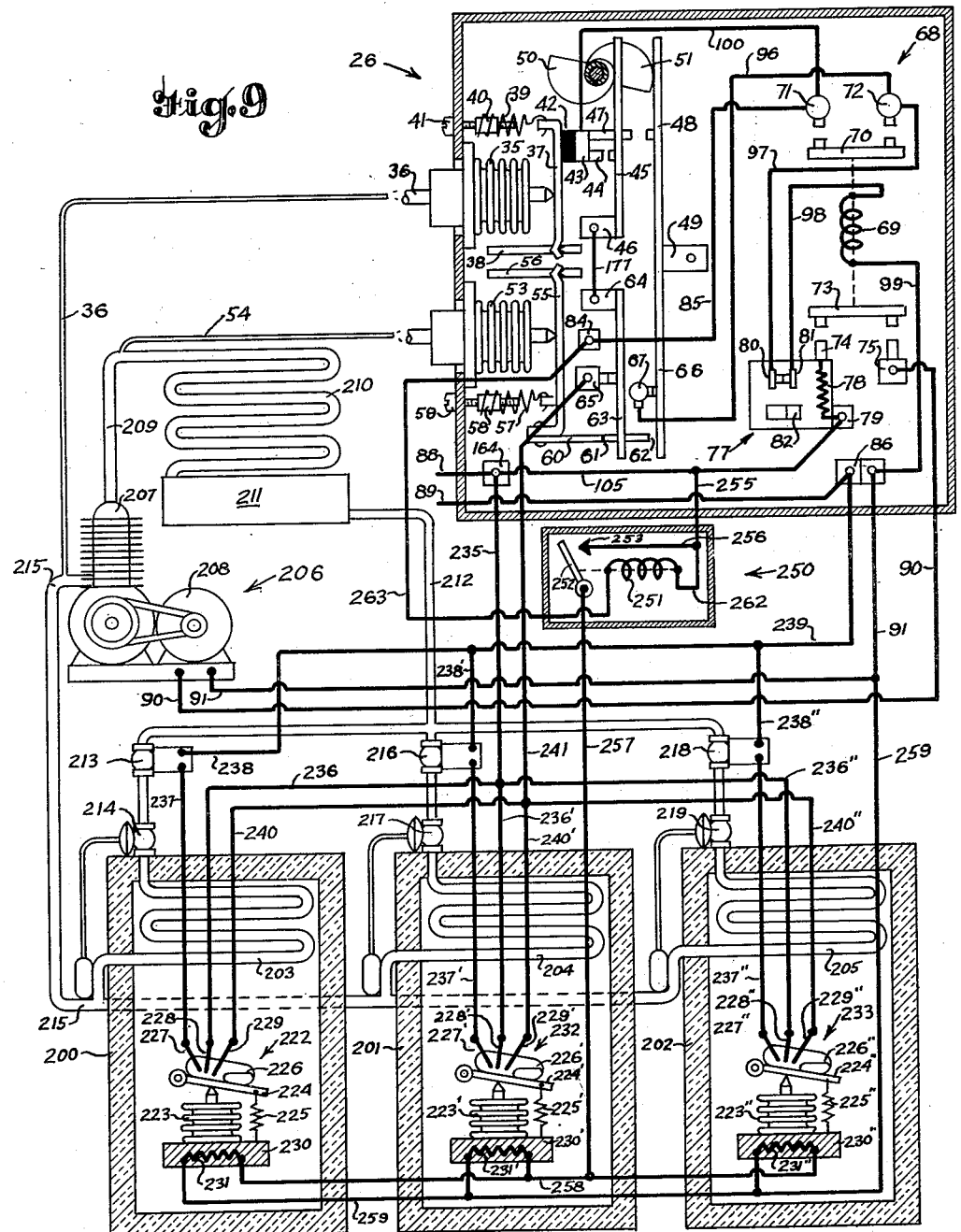
Figure 9 is a diagrammatic illustration of still another form of this invention as applied to multiple fixture or space refrigerating apparatus.

Referring now to Figure 9, a multiple fixture arrangement having three fixtures or spaces 200, 201, 202 is shown. Each fixture or space is provided with an evaporator 203, 204, and 205, respectively. The cooling of the fixtures is accomplished by a refrigerating apparatus generally designated at 206 and which may comprise a compressor 207 operated by a compressor motor 208, a high pressure line 209, a condenser 210, and a receiver 211. Liquid refrigerant passes from the receiver 211 through a liquid line 212, a solenoid valve 213, and a thermostatic expansion valve 214 to the evaporator 203. Refrigerant is withdrawn from the evaporator 203 through a low pressure or suction line 215 by the compressor 207. Liquid refrigerant is supplied to the evaporator 204 from the liquid line 212 through a solenoid valve 216 and a thermostatic expansion valve 217 and liquid refrigerant is supplied to the evaporator 205 from the liquid line 212 through a solenoid valve 218 and a thermostatic expansion valve 219.

The fixture 200 is provided with a thermostatic control means generally designated at 222 and this thermostatic control means may comprise a bellows 223 for operating a lever 224 against the action of a tension spring 225. The lever 224 operates a mercury switch 226 having electrodes 227, 228, and 229. The bellows 223 is intimately associated with a heat absorbing mass 230 in which is imbedded a heater 231. For purposes of illustration it is assumed that the mercury switch 226 is titled to the "on" position to bridge electrodes 227, 228, and 229 when the temperature of the thermostatic control device 222 rises to 40° and is tilted to the "off" position shown in Figure 9 when the temperature decreases to 36°. The fixture 201 is provided with a thermostatic control means 232 which is identical with the thermostatic control means 222 and therefore like reference characters primed have been utilized for designating like parts. The fixture 202 is provided with a thermostatic control means 233 which is in all respecets the same as the thermostatic control means 222 and therefore like reference characters double primed have been utilized for designating like parts.

Each thermostatic control means controls its respective solenoid valve and the thermostatic control means operate in conjunction with the unitary control arrangement 26 for controlling the operation of the refrigerating apparatus. The unitary control arrangement 26 is exactly the same as the unitary control arrangement of Figure 4 with the exception that the extra contacts 165 and 166 of Figure 4 are omitted.

Assume now that the temperature of the thermostatic control means 222 rises to 40° then the solenoid valve 213 is opened by means of a circuit extending from the line wire 88 through wires 235 and 236, electrodes 228 and 227 of the thermostatic control means 222, wire 237, solenoid valve 213, wires 238 and 239 and power terminal 86 back to the other line wire 89. Completion of this circuit energizes the solenoid valve to supply refrigerant to the evaporator 203 of the fixture 200. In a like manner when the thermostatic control means 232 or 233 call for cooling, their respective solenoid valves 216 and 218 are opened.

Assume now that the high pressure has decreased to 135 pounds, that the low pressure has risen to 40 pounds as a result of defrosting of all of the evaporators and that the temperature of the thermostatic control means 222 rises to 40°. This completes a starting circuit for the relay or starter 68 which may be traced from the line wire 88 through power terminal 164, wires 235 and 236, electrodes 228 and 229 of the thermostatic control means 222, wires 240 and 241, contact 65, contact member 63, terminal 64, conductor 177, terminal 46, contact member 45, contact 44, bridge member 43, contact 47, contact members 48 and 66, contact 67, conductor 96, contact 72, conductor 97, contacts 80 and 81, conductor 98, operating coil 69, conductor 99, and power terminal 86 back to the line wire 89. Completion of this circuit pulls in the relay or starter 68 to place the compressor 207 in operation and to complete a maintaining circuit for the operating coil 69 which is independent of the contact members 48 and 66. This maintaining circuit may be traced from the line wire 88 through power terminal 164, wires 235 and 236, electrodes 228 and 229, wires 240 and 241, contact 65, contact member 63, terminal 64, conductor 177, terminal 46, contact member 45, contact 44, bridge member 43, conductor 100, contact 71, bridge member 70, contact 72, conductor 97, contacts 80 and 81, conductor 98, operating coil 69, conductor 99, and power terminal 86 back to the other line wire 89. Completion of this maintaining circuit maintains the refrigerating apparatus in operation until the temperature of the thermostatic control means 222 decreases to 36° or until the suction pressure decreases to 20 pounds or until the high pressure rises to 185 pounds.

The electrodes 228' and 229' of the thermostatic control means 232 and the electrodes 228" and 229" of the thermostatic control means 233 are connected in parallel with the electrodes 228 and 229 of the thermostatic control means 222. Accordingly any of the thermostatic control means 222, 232, and 233 may place the refrigerating apparatus in operation and the refrigerating apparatus will remain in operation until all of these thermostatic control means become satisfied. So far this modification as shown in Figure 9 operates in exactly the same manner as the modification shown in Figure 4.

Provision is also made in Figure 9 for causing the thermostatic control means to cycle substantially together so that the refrigerating apparatus will not be maintained in continuous operation but may be shut down to allow defrosting of the evaporator coils. This means for causing the thermostatic control means to cycle substantially together is accomplished by the heat absorbing masses and the heater element imbedded therein. The heater elements 231, 231', and 231" are controlled by an auxiliary relay generally designated at 250. This relay may comprise an operating coil 251 which when energized moves a switch arm 252 into engagement with a contact 253. When the relay coil 251 is deenergized the switch arm 252 is moved out of engagement with the contact 253. Assume now that the switch arm 252 is engaging contact 253, energy is then supplied to the heater elements 231, 231', and 231" which are connected in parallel with respect to each other, this energy being supplied through a circuit extending from the line wire 88 through power terminal 164, conductor 105, wires 255 and 256, contact 253, switch arm 252, wires 257 and 258 through the heaters in parallel, wires 259 and 91, and power terminal 86 back to the other line wire 89. Accordingly whenever the auxiliary relay 250 is energized the heater elements 231, 231', 231" are energized to supply heat to the heat absorbing masses which in turn conduct their heat to the thermostatic control means.

Assume that the parts are in the position shown in Figure 9 wherein all of the thermostatic control means are satisfied and the suction pressure is below 40 pounds, the refrigerating apparatus is shut down and as a result the suction pressure rises to 40 pounds after defrosting of the evaporator coils has taken place. When the suction pressure rises to 40 pounds a circuit is completed from the line wire 88 through power terminal 164, conductor 105, wires 255 and 262, relay coil 251 of the auxiliary relay 250, wire 263, control terminal 84, wire 85, contact 71, wire 100, bridge member 43, contact 47, contact members 48 and 66, contact 67, conductor 96, contact 72, conductor 97, contacts 80 and 81, conductor 98, operating coil 69, conductor 99, and power terminal 86 back to the other line wire 89. Completion of this circuit energizes the operating coil 251 but since the resistance thereof is relatively high the operating coil 69 of the relay or starter 68 does not pull in the relay. Energization of the relay coil 251 of the auxiliary relay 250 causes heating of the thermostatic control means 222, 232, and 233 in the manner pointed out above. This heat is stored in the heat absorbing masses 230, 230', and 230" and is dissipated to the thermostatic control means. As a result all of the thermostatic control means will tend to assume the cut-in value of 40° at substantially the same time and when one of these thermostatic control means assumes this 40° cut-in temperature value, a starting circuit for the relay coil 69 of the relay or starter 68 is completed in the manner pointed out above. This starting circuit and the maintaining circuit established thereafter are both in parallel with the relay coil 251 of the auxiliary relay 250 which shunt out this relay coil to cause the auxiliary relay 250 to drop out and hence interrupt the supply of heat to the thermostatic control means when the compressor is operating. The refrigerating apparatus will continue in operation until all of the thermostatic control means become satisfied and then the refrigerating apparatus will shut down with a consequent defrosting cycle. After defrosting has been accomplished the system will cycle as pointed out immediately above.

In this modification as in the preceding modification the means for causing the thermostatic control means to cycle substantially together is placed in operation after defrosting has been established and is continued in operation until the refrigerating apparatus is placed in operation. The heater elements 231, 231', and 231" of this modification not only cause the thermostatic control means to cycle substantially together but also maintains the temperature within the various fixtures within closer limits for reasons pointed out above in connection with Figures 1 to 3.

Figure 10:
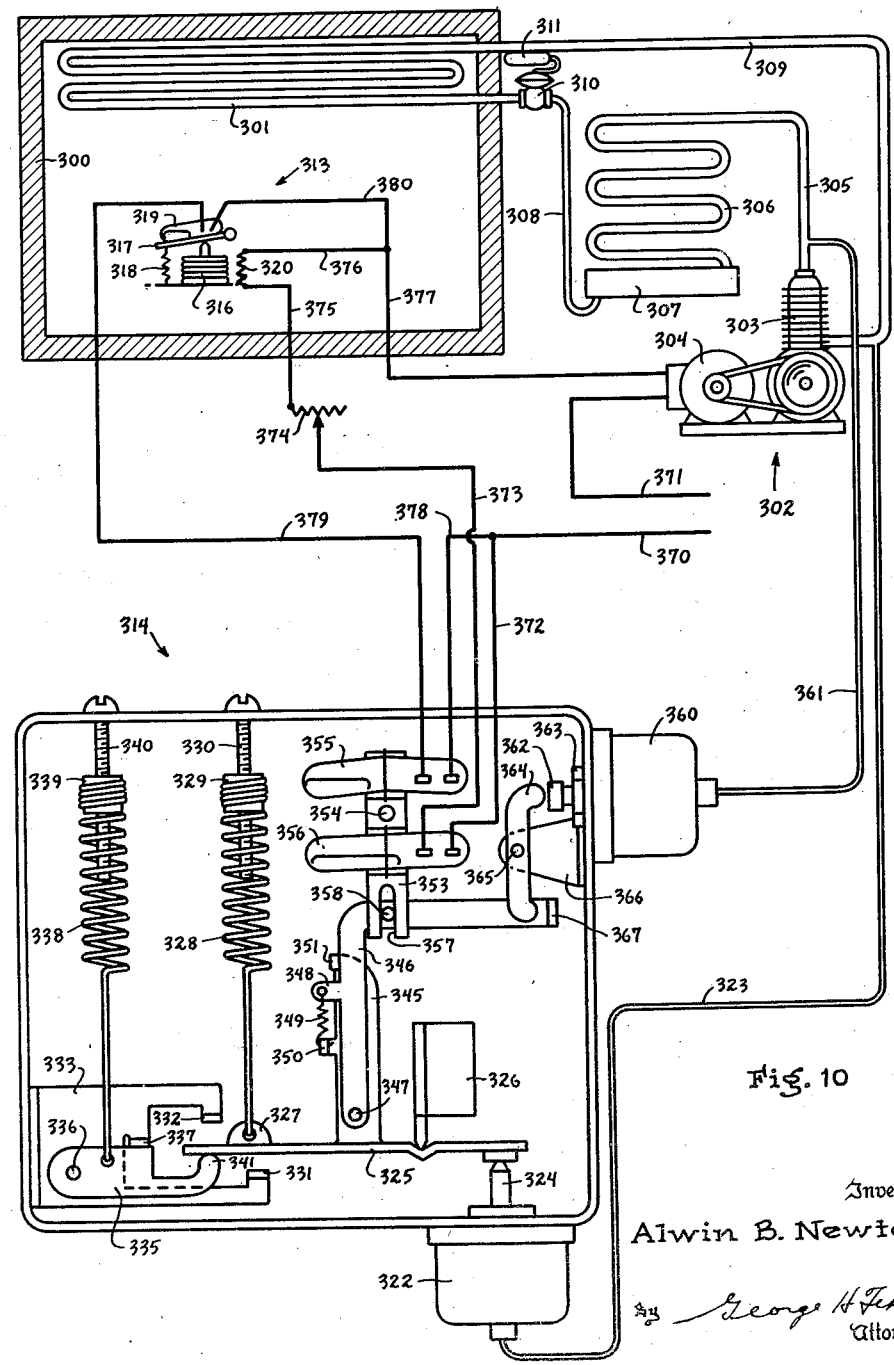
Figure 10 is a diagrammatic illustration of a further form of this invention for accomplishing substantially the same results as are accomplished by the arrangement of Figure 1.

Referring now to Figure 10 another control arrangement is illustrated for accomplishing substantially the same results as are accomplished by the control arrangement of Figure 1. In Figure 10 the fixture or space 300 is cooled by a cooling coil in the form of an evaporator 301. Refrigerant is circulated through the evaporator 301 by means of a refrigerating apparatus generally designated at 302. The refrigerating apparatus 302 may comprise a compressor 303 operated by an electric motor 304. Compressed refrigerant is discharged from the compressor 303 through a high pressure line 305 to a condenser 306 and condensed refrigerant is collected in a receiver 307. Liquid refrigerant flows from the receiver 307 through a liquid line 308 to the evaporator 301 and evaporated refrigerant is withdrawn from the evaporator 301 by the compressor 303 through a suction line 309. The flow of refrigerant to the evaporator 301 may be controlled by a thermostatic expansion valve 310 having a thermal bulb 311 responding to the temperature of the refrigerant leaving the evaporator 301. For purposes of illustration in this modification it is assumed that the refrigerant circulated through the refrigerating system is dichlorodifluoromethane commonly termed Freon 12. The above construction is conventional in the art and therefore a further description thereof is not considered necessary it being sufficient to state that when the refrigerating apparatus is operated the evaporator 301 operates to cool the fixture or space 300.

The refrigerating apparatus 302 is controlled by a thermostatic control means generally designated at 313 responsive to the temperature within the fixture or space 300 and by a control arrangement generally designated at 314 responsive to the suction pressure and hence evaporator temperature and to the pressure on the high pressure side of the refrigerating apparatus.

The thermostatic control means 313 may comprise a bellows 316 charged with a volatile fluid for operating a lever 317 against the action of an adjustable tension spring 318 for operating a mercury switch 319. The bellows 316 is artificially heated by a heater 320. For purposes of illustration it is assumed that when the temperature of the bellows 316 rises to 46° mercury switch 319 is closed and when the temperature thereof decreases to 36° the mercury switch 319 is opened.

The control arrangement 314 may comprise a bellows casing 322 connected by a pipe 323 to the suction line 309. A bellows contained within the casing 322 operates a plunger 324 which in turn operates a lever 325 fulcrumed on a fulcrum member 326 in accordance with changes in suction pressure and hence changes in evaporator temperature. The lever 325 carries a lug 327 to which is secured one end of an adjustable tension spring 328. The other end of the adjustable tension spring 328 is connected to a nut 329 screw threadedly mounted on a screw 330. The spring 328 operates in opposition to the bellows 322 and the operating force of the spring 328 may be adjusted by suitably rotating the screw 330. The movement of the lever 325 about the fulcrum member 326 is limited by lower and upper stops 331 and 332, respectively, carried by a bracket 333.

A lever 335 is pivoted to the bracket 333 by a pin 336 and is urged upwardly into engagement with a stop 337 also carried by the bracket 333 by an adjustable tension spring 338. One end of the spring 338 is connected to the lever 335 and the other end is connected to a nut 339 screw threadedly mounted on a screw 340. By rotating the screw 340 the force of the spring 338 may be adjusted at will. The lever 335 is provided with an abutment surface 341 for engaging the lever 325. The spring 338 operating through the lever 335 is effective to move the lever 325 in a clockwise direction from its lower position adjacent the stop 331 to the position shown in Figure 10. The stop 337 prevents the lever 335 from moving the lever 325 from the mid position shown in Figure 10 to the upper stop 332.

The lever 325 is provided with an extension 345 to which is pivoted an arm 346 by a pin 347. The arm 346 is provided with a lug 348 which is connected by a spring 349 to a lug 350 carried by the extension 345. The spring 349 urges the arm 346 into engagement with a lug 351 carried by the extension 345, the spring 349 acting as a strain release connection between the extension 345 and the arm 346.

A mercury switch carrier 353 is pivotally mounted at 354 and carries mercury switches 355 and 356. The mercury switch carrier 353 is provided with a slot 357 in which is located a pin 358 carried by the arm 346. Upon clockwise rotation of the lever 325 the mercury switch carrier 353 is moved in a counter-clockwise direction to open the mercury switches 355 and 356 and upon movement of the lever 325 in a counter-clockwise direction the mercury switch carrier 353 is moved in a clockwise direction to close the mercury switches 355 and 356.

The control arrangement 314 also includes a bellows casing 360 which is connected by a pipe 361 to the high pressure line 305 of the refrigerating apparatus. The bellows within the casing 360 operates a plunger 362 and the bellows may be opposed by a spring also located in the casing 360 the force of the spring being adjusted by a nut 363. The plunger 362 is therefore operated in accordance with changes in pressure on the high pressure side of the refrigerating apparatus. The plunger 362 is adapted to engage one end of a lever 364 pivoted at 365 to a bracket 366. The other end of the lever 364 is adapted to engage a lug 367 carried by the arm 346.

Figure 11:
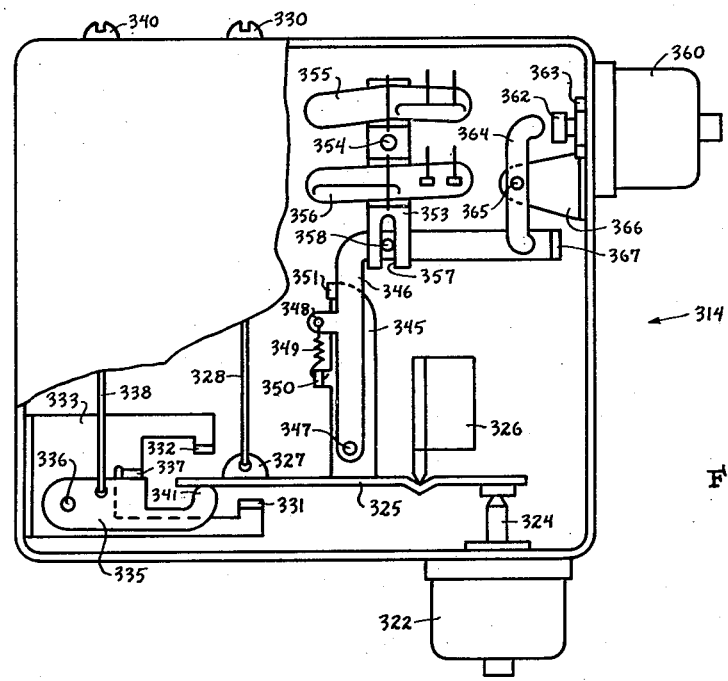
Figures 11 and 12 are views showing the control arrangement of Figure 10 in different operative positions.

For purposes of illustration it is assumed that with the parts in the position shown in Figure 10 the suction pressure is 29 pounds, corresponding to a temperature of 31° in the evaporator since Freon is being utilized as a refrigerant in this modification, and that the pressure on the high pressure side of the refrigerating apparatus is 140 pounds. In Figure 10 it is noted that both mercury switches 355 and 356 are open. As the suction pressure increases from 29 pounds to 32 pounds, corresponding to an evaporator temperature of 35°, both springs 328 and 338 are overcome to move the lever 325 into engagement with the lower stop 331. When the lever 325 is moved into engagement with the lower stop 331 both mercury switches 355 and 356 are closed. As the suction pressure decreases from 32 pounds to 29 pounds the lever 325 is moved to the mid position as shown in Figure 11 but it is here noted that the mercury switch 355 remains closed while the mercury switch 356 is open. The lever 325 and hence the mercury switches 355 and 356 remain in the positions shown in Figure 11 until such time as the suction pressure decreases to 16 pounds, corresponding to an evaporator temperature of substantially 12°. As the suction pressure decreases from 16 pounds to 15 pounds the lever 325 is moved into engagement with the upper stop 332 to open the mercury switch 355, the mercury switch 356 being already opened at this time. As the suction pressure increases from 15 pounds to 16 pounds the lever 325 is moved from the upper stop 332 to the mid position shown in Figure 10 and the lever 325 will remain in this mid position until the suction pressure starts rising above 29 pounds to repeat the cycle of operation outlined above.

Assume now that the parts are in the position shown in Figure 11 wherein the mercury switch 355 is closed and wherein the suction pressure is somewhere between 16 pounds and 29 pounds. If now the pressure on the high pressure side of the refrigerating apparatus should increase to 190 pounds the plunger 362 operates the lever 364 which in turn rotates the arm 346 about its pivot 347 to open the switches 355 and 356, this opening of the switches being permitted by the strain release connection. After the switches have been opened in this manner it is impossible to reclose the switches until such time as the pressure on the high pressure side of the refrigerating apparatus decreases to 140 pounds to move the lever 364 out of engagement with the lug 367. The lever 364 is so arranged with respect to the lug 367 that it is impossible to reclose the mercury switches 355 and 356 until pressure on the high pressure side of the refrigerating apparatus decreases to 140 pounds regardless of whether the switches were opened by an increase in pressure on the high pressure side of the refrigerating apparatus or by a decrease in suction pressure. Accordingly it is seen that in this modification the mercury switches 355 and 356 may be closed only when the pressure on the high pressure side of the refrigerating apparatus decreases to 140 pounds and the suction pressure rises to 32 pounds which corresponds to an evaporator temperature of substantially 35°. Thus defrosting of the evaporator must occur before the mercury switches 355 and 356 are closed. Mercury switch 356 is opened whenever the suction pressure decreases to 29 pounds and the mercury switch 355 is opened whenever the suction pressure decreases to 16 pounds. Both switches may be opened when the pressure on the high pressure side of the refrigerating apparatus increases to 190 pounds.

Power is supplied to the refrigerating apparatus by means of line wires 370 and 371 leading from some source of power (not shown). As pointed out above the differential of operation of the thermostatic control means 313 is substantially 10°, that is, the difference in temperature between 36° wherein the mercury switch 319 is opened and 46° wherein the mercury switch 319 is closed. Assume now that the auxiliary heater 320 is capable of supplying only 9° of auxiliary heat to the bellows 316 of the thermostatic control means 313 and also assume that the temperature within the fixture 300 is 36°. With the parts in the position shown in Figure 10 both mercury switches 355 and 356 are opened and hence the compressor 303 is not operating. As a result the suction pressure increases to the starting value of 32 pounds to move the lever 325 into engagement with the lower stop 331 to close both mercury switches 355 and 356. Closure of the mercury switch 356 completes a circuit from the line wire 370 through wire 372, mercury switch 356, wire 373, variable resistance 374, wire 375, heater 320, wires 376 and 377 and compressor motor 304 back to the other line wire 371. Completion of this circuit energizes the auxiliary heater 320 to heat locally the bellows 316 to raise the temperature of the bellows 316 above the temperature condition existing within the fixture 300. The heater 320 is of sufficiently high resistance that the compressor motor 304 is not operated under these conditions. The heater 320 supplies 9° of heat to the bellows 316 to raise the temperature thereof 9° above the temperature within the fixture 300 and hence the temperature of the bellows will assume a value of 45°. However the mercury switch 319 is not closed until such time as the temperature within the fixture rises to 37° to cause the temperature of the bellows 316 to assume the starting temperature value of 46°. When this occurs a circuit is completed from the line wire 370 through wire 378, mercury switch 355, wire 379, mercury switch 319, wires 380 and 377 and compressor motor 304 back to the other line wire 371. Completion of this circuit places the refrigerating apparatus in operation to cool the air within the fixture 300. Completion of this circuit also shunts out the heater 320 so that it no longer locally heats the bellows 316.

When the compressor is thus placed in operation the suction pressure is immediately reduced to 29 pounds to open the mercury switch 356, the mercury switch 355 remaining closed. Since the auxiliary heater 320 is ineffective the temperature of the bellows 316 decreases to the temperature of the air within the enclosure 300 and when the temperature of the air within the enclosure 300 decreases to 36° the mercury switch 319 is opened to stop operation of the compressor motor 304 and hence compressor 303. If before the mercury switch 319 opens, the suction pressure should decrease to 15 pounds to open the mercury switch 355 the compressor motor 304 and hence the compressor 303 will also be stopped. Likewise if the pressure on the high pressure side of the refrigerating apparatus should increase to 190 pounds the mercury switch 355 will also be opened to stop operation of the compressor. When the compressor is stopped either by the temperature within the fixture decreasing to 36° or by the suction pressure decreasing to 15 pounds or by the pressure on the high pressure side increasing to 190 pounds the refrigerating apparatus cannot again be placed in operation until the pressure on the high pressure side decreases to 140 pounds, the suction pressure increases to 32 pounds and the temperature within the fixture 300 increases to 37°. Thus starting of the compressor against high head pressures is prevented, defrosting of the refrigerating apparatus each cycle of operation is assured and maintenance of fixture temperature between 36° and 37° is assured.

Figure 12:
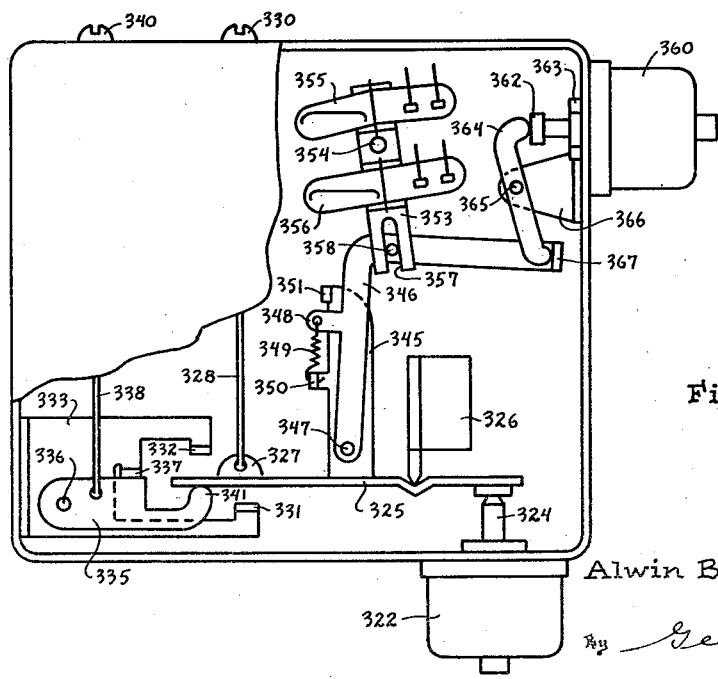

Assume now that the variable resistance 374 is so adjusted that the heater 320 is capable of supplying more degrees of heat to the bellows 316 than the differential of operation of the thermostatic control means 313, namely, 12° of heat. Under these conditions when the pressure on the high pressure side decreases to 140 pounds and the suction pressure decreases to 32 pounds to close the mercury switches 355 and 356, 12° of artificial heat are added by the heater 320 to the bellows 316 and accordingly the mercury switch 319 will be closed even though the temperature within the fixture should be below the desired value of 36°, namely, 34°. When the mercury switch 319 is closed the compressor motor 304 and hence the compressor 303 are placed in operation and the heater 320 is rendered ineffective. Since the heater 320 is ineffective while the compressor is operating the temperature of the bellows 316 decreases to the temperature of the air within the fixture 300 and as soon as the temperature of the bellows 316 decreases to 36° the mercury switch 319 is opened to stop operation of the compressor. Accordingly it is seen that when the heater 320 is so arranged as to supply an excess amount of heat to the bellows 316, the compressor is placed in operation for an appreciable period of time every time that the suction pressure increases to 32 pounds and the head pressure decreases to 140 pounds, regardless of whether the fixture temperature is above or below the desired value of 36°. If when the compressor is started in this manner the temperature within the fixture should be above 36° the compressor will remain in operation until such time as the fixture temperature decreases to 36°. The modification illustrated by Figures 10, 11 and 12 therefore operates in substantially the same manner as the modification illustrated by Figure 1.

Although various temperature and pressure values have been utilized for purposes of illustration, this invention is not to be limited to these values since various temperature and pressure values may be utilized for obtaining desired sequences of operation within the contemplation of this invention. Although for purposes of illustration various forms of this invention have been disclosed, other forms thereof may become apparent to those skilled in the art upon reference to this disclosure and therefore this invention is to be limited only by the scope of the appended claims.

I claim as my invention:

1. In a control system for a refrigerating apparatus having evaporator means for cooling a medium and a mechanism for controlling the circulation of refrigrant through the evaporator means, the combination of, control means responsive to the temperature of the evaporator means, control means responsive to the temperature of the medium being cooled by the evaporator means, means controlled by both of the control means for controlling the mechanism always to start circulation of refrigerant through the evaporator means only when the evaporator temperature increases to a predetermined value regardless of whether the temperature of the medium being cooled by the evaporator means is above or below a predetermined value and said evaporator temperature responsive means having means associated therewith whereby after circulation of refrigerant has been started through the evaporator means it is continued for an appreciable period of time or until the temperature of the medium being cooled by the evaporator means decreases to said predetermined value.

2. In a control system for a refrigerating apparatus having evaporator means for cooling a medium and a mechanism for controlling the circulation of refrigerant through the evaporator means, the combination of control means including means responsive to the temperature of the evaporator means for controlling the mechanism always to start circulation of refrigerant through the evaporator means only when the temperature of the evaporator means increases to a predetermined value and to continue circulation of refrigerant through the evaporator means for an appreciable period of time, and means responsive to the temperature of the medium being cooled by the evaporator means for continuing circulation of refrigerant through the evaporator means after circulation has been started as long as the temperature of the medium is above a predetermined value.

3. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, means controlled by said thermostatic control means for controlling the mechanism to start circulation of refrigerant through the evaporator means when the temperature of the thermostatic control means rises to a predetermined high value and to stop circulation of refrigerant through the evaporator means when the temperature of the thermostatic control means decreases to a predetermined low value, means for supplying auxiliary heat to the thermostatic control means for locally heating the same, and control means responsive to the temperature of the evaporator means for operating said auxiliary heat supplying means only when the evaporator temperature increases to a predetermined high value to cause the thermostatic control means to assume said predetermined high temperature value before the temperature of the medium being cooled by the evaporator means assumes said predetermined high temperature value.

4. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, means controlled by said thermostatic control means for controlling the mechanism to start circulation of refrigerant through the evaporator means when the temperature of the thermostatic control means rises to a predetermined high value and to stop circulation of refrigerant through the evaporator means when the temperature of the thermostatic control means decreases to a predetermined low value, means for supplying auxiliary heat to the thermostatic control means for locally heating the same, control means responsive to the temperature of the evaporator means, and means controlled by the last mentioned control means and the thermostatic control means for operating the auxiliary heat supplying means only when the evaporator temperature increases to a predetermined high value and only until the temperature of the thermostatic control means rises to said predetermined high value to cause the thermostatic control means to assume said predetermined high temperature value before the temperature of the medium being cooled by the evaporator means assumes said predetermined high temperature value.

5. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, control means responsive to the temperature of the evaporator means, means controlled by both of said control means for controlling the mechanism to start circulation of refrigerant through the evaporator means only when the temperature of the thermostatic control means rises to a predetermined high value and the evaporator temperature rises to a predetermined high value and to stop circulation of refrigerant through the evaporator means when the temperature of the thermostatic control means decreases to a predetermined low value, and means for supplying auxiliary heat to the thermostatic control means for locally heating the same only when refrigerant is not being circulated through the evaporator means to cause the thermostatic control means to assume said predetermined high temperature value before the temperature of the medium being cooled by the evaporator means assumes said predetermined high temperature value.

6. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, control means responsive to the temperature of the evaporator means, means controlled by both of said control means for controlling the mechanism to start circulation of refrigerant through the evaporator means only when the temperature of the thermostatic control means rises to a predetermined high value and the evaporator temperature rises to a predetermined high value and to stop circulation of refrigerant through the evaporator means when the temperature of the thermostatic control means decreases to a predetermined low value, and means for supplying auxiliary heat to the thermostatic control means for locally heating the same when the evaporator temperature increases to said predetermined high value to cause the thermostatic control means to assume said predetermined high temperature value before the temperature of the medium being cooled by the evaporator means assumes said predetermined high temperature value.

7. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, control means responsive to the temperature of the evaporator means, means controlled by both of said control means for controlling the mechanism to start circulation of refrigerant through the evaporator means only when the temperature of the thermostatic control means rises to a predetermined high value and the evaporator temperature rises to a predetermined high value and to stop circulation of refrigerant through the evaporator means when the temperature of the thermostatic control means decreases to a predetermined low value, and means for supplying auxiliary heat to the thermostatic control means for locally heating the same only when the evaporator temperature increases to said predetermined high value and only until the temperature of the thermostatic control means rises to said predetermined high value to cause the thermostatic control means to assume said predetermined high temperature value before the temperature of the medium being cooled by the evaporator means assumes said predetermined high temperature value.

8. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, control means responsive to the pressure on the high pressure side of the refrigerating apparatus, means controlled by both of said control means for controlling the mechanism to start circulation of refrigerant through the evaporator means only when the temperature of the thermostatic control means rises to a predetermined high value and the pressure on the high pressure side decreases to a predetermined low value and to stop circulation of refrigerant through the evaporator means when the temperature of the thermostatic control means decreases to a predetermined low value, and means for supplying auxiliary heat to the thermostatic control means for locally heating the same only when the pressure on the high pressure side decreases to said predetermined low value and only until the temperature of the thermostatic control means rises to said predetermined high value to cause the thermostatic control means to assume said predetermined high temperature value before the temperature of the medium being controlled by the evaporator means assumes said predetermined high temperature value.

9. In a control system for a refrigerating apparatus having evaporator means for cooling a medium and a mechanism for controlling the circulation of refrigerant through the evaporator means, the combination of, thermostatic control means responsive to the temperature of the medium being cooled by the evaporator means, control means responsive to the temperature of the evaporator means, control means responsive to the pressure on the high pressure side of the refrigerating apparatus, means controlled by all of said control means for controlling the mechanism to start circulation of refrigerant through the evaporator means only when the temperature of the thermostatic control means rises to a predetermined high value, the evaporator temperature rises to a predetermined high value and the pressure on the high pressure side decreases to a predetermined low value and to stop circulation of refrigerant through the evaporator means when the temperature of the thermostatic control means decreases to a predetermined low value, and means for supplying auxiliary heat to the thermostatic control means for locally heating the same only when the evaporator temperature increases to said predetermined high value and the pressure on the high pressure side decreases to said predetermined low value and only until the temperature of the thermostatic control means rises to said predetermined high value to cause the thermostatic control means to assume said predetermined high temperature value before the temperature of the medium being cooled by the evaporator means assumes said predetermined high temperature value.

10. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, thermostatic control means for each space and responsive to variations in temperature thereof, means controlled by said thermostatic control means for placing the compressor in operation when the temperature of any thermostatic control means rises to predetermined high values and stopping operation of the compressor only when the temperature of all of the thermostatic control means decreases to predetermined low values, heating means for each thermostatic control means for locally heating the same, and means for operating all of the heating means when the compressor is not operating to cause the temperature of the thermostatic control means to assume the predetermined high temperature values before the temperature of the spaces assumes the predetermined high temperature values and for rendering all of the heating means inoperative when the compressor is operating.

11. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the temperature of the thermostatic control means rises to a predetermined high value and for closing the valve means when the temperature of the thermostatic control means decreases to a predetermined low value, means controlled by said thermostatic control means for placing the compressor in operation when the temperature of any thermostatic control means rises to said predetermined values and stopping operation of the compressor only when the temperature of all of the thermostatic control means decreases to said predetermined low values, heating means for each thermostatic control means for locally heating the same, and means for operating all of the heating means when the compressor is not operating and all of the valve means are closed to cause the temperature of the thermostatic control means to assume the predetermined high temperature values before the temperature of the spaces assumes the predetermined high temperature values and for rendering all of the heating means inoperative when the compressor is operating and at least one of the valve means is opened.

12. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the temperature of the thermostatic control means rises to a predetermined high value and for closing the valve means when the temperature of the thermostatic control means decreases to a predetermined low value, control means responsive to the temperature of all of the evaporators, means controlled by said control means for placing the compressor in operation when the evaporator temperature increases to a predetermined high value and for stopping operation of the compressor when the evaporator temperature decreases to a predetermined low value, heating means for each thermostatic control means for locally heating the same, and means for operating the heating means when the valve means are closed to cause the temperature of the thermostatic control means to assume the predetermined high temperature values before the temperature of the spaces assumes the predetermined high temperature values and for rendering the heating means inoperative when the valve means are opened.

13. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the space temperature affecting that thermostatic control means rises to a predetermined high value and for closing the valve means when the space temperature decreases to a predetermined low value, control means responsive to the temperature of all of the evaporators, means controlled by all of said control means to start operation of the compressor only when the temperature of the evaporators rises to a predetermined high value and the temperature in any space rises to said predetermined high values and to stop operation of the compressor when the temperature of all of the spaces decreases to said predetermined low values, and means for causing the thermostatic control means to cycle substantially together so that they will not keep the compressor operating continuously.

14. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the space temperature affecting that thermostatic control means rises to a predetermined high value and for closing the valve means when the space temperature decreases to a predetermined low value, control means responsive to the temperature of all of the evaporators, means controlled by all of said control means to start operation of the compressor only when the temperature of the evaporators rises to a predetermined high value and the temperature in any space rises to said predetermined high values and to stop operation of the compressor when the temperature of all of the spaces decreases to said predetermined low values, and means operative when the temperature of the evaporators rises to said predetermined high value for causing the thermostatic control means to cycle substantially together so that they will not keep the compressor operating continuously.

15. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the space temperature affecting that thermostatic control means rises to a predetermined high value and for closing the valve means when the space temperature decreases to a predetermined low value, control means responsive to the temperature of all of the evaporators, means controlled by all of said control means to start operation of the compressor only when the temperature of the evaporators rises to a predetermined high value and the temperature in any space rises to said predetermined high values and to stop operation of the compressor when the temperature of all of the spaces decreases to said predetermined low values, and means for supplying auxiliary heat to the thermostatic control means when the compressor is not operating to cause the thermostatic control means to cycle substantially together so that they will not keep the compressor operating continuously.

16. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the space temperature affecting that thermostatic control means rises to a predetermined high value and for closing the valve means when the space temperature decreases to a predetermined low value, control means responsive to the temperature of all of the evaporators, means controlled by all of said control means to start operation of the compressor only when the temperature of the evaporators rises to a predetermined high value and the temperature in any space rises to said predetermined high values and to stop operation of the compressor when the temperature of all of the spaces decreases to said predetermined low values, and means for supplying auxiliary heat to the thermostatic control means under the control of the thermostatic control means to cause them to cycle substantially together.

17. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the space temperature affecting that thermostatic control means rises to a predetermined high value and for closing the valve means when the space temperature decreases to a predetermined low value, control means responsive to the temperature of all of the evaporators, means controlled by all of said control means to start operation of the compressor only when the temperature of the evaporators rises to a predetermined high value and the temperature in any space rises to said predetermined high values and to stop operation of the compressor when the temperature of all of the spaces decreases to said predetermined low values, and means for supplying auxiliary heat to the thermostatic control means when the temperature of the evaporators rises to said predetermined high value.

18. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, valve means associated with each evaporator for controlling the supply of refrigerant thereto, thermostatic control means for each space and responsive to variations in temperature thereof, means controlled by each thermostatic control means for opening its associated valve means when the space temperature affecting that thermostatic control means rises to a predetermined high value and for closing the valve means when the space temperature decreases to a predetermined low value, control means responsive to the temperature of all of the evaporators, means controlled by all of said control means to start operation of the compressor only when the temperature of the evaporators rises to a predetermined high value and the temperature in any space rises to said predetermined high values and to stop operation of the compressor when the temperature of all of the spaces decreases to said predetermined low values, and means for supplying auxiliary heat to the thermostatic control means when the temperature of the evaporators rises to said predetermined high value and until any one of said thermostatic control means assumes a temperature corresponding to said predetermined high space temperature value.

19. In a refrigerating system for controlling the temperature of a plurality of spaces or fixtures and including a refrigerating apparatus having a plurality of evaporators, one for each space, and a compressor for supplying and withdrawing refrigerant to and from the evaporators, the combination of, thermostatic control means for each space and adapted to assume a temperature corresponding to the temperature of its associated space, means controlled by said thermostatic control means for placing the compressor in operation when the temperature of any thermostatic control means rises to a predetermined value, heating means associated with each thermostatic control means, and means under the control of the thermostatic control means for controlling the heating effect of the heating means when the compressor is not operating to supply a greater amount of heat to the thermostatic control means that are at relatively low temperatures and a lesser amount of heat to those that are at relatively high temperatures whereby all of the thermostatic control means tend to assume the predetermined temperature values at substantially the same time.

20. In a control system for a refrigerating apparatus having evaporator means for cooling a medium and an electrically operated mechanism for controlling the circulation of refrigerant through the evaporator means, the combination of, first switch means, thermostatic control means responsive to the temperature of the medium being cooled for closing the first switch means when the temperature thereof increases to a predetermined high value and for opening the first switch means when the temperature thereof decreases to a predetermined low value, means for completing a circuit through the first switch means and the mechanism to cause circulation of refrigerant through the evaporator means, a heater for locally heating the thermostatic control means, second switch means for energizing the heater when closed, and control means responsive to the temperature of the evaporator means for closing the second switch means when the evaporator temperature increases to a predetermined high value to cause the temperature of the thermostatic control means to assume said predetermined high value to start circulation of refrigerant through the evaporator means.

21. In a control system for a refrigerating apparatus having evaporator means for cooling a medium and an electrically operated mechanism for controlling the circulation of refrigerant through the evaporator means, the combination of, first switch means, thermostatic control means responsive to the temperature of the medium being cooled for closing the first switch means when the temperature thereof increases to a predetermined high value and for opening the first switch means when the temperature thereof decreases to a predetermined low value, means for completing a circuit through the first switch means and the mechanism to cause circulation of refrigerant through the evaporator means, a heater for locally heating the thermostatic control means, second switch means for energizing the heater when closed, control means responsive to the temperature of the evaporator means for closing the second switch means when the evaporator temperature increases to a predetermined high value to cause the temperature of the thermostatic control means to assume said predetermined high value to start circulation of refrigerant through the evaporator means, third switch means included in said circuit, and means responsive to the temperature of the evaporator means for opening the third switch means when the evaporator temperature decreases to a predetermined low value to stop circulation of refrigerant through the evaporator means.

22. In a control system for a refrigerating apparatus having evaporator means for cooling a medium and an electrically operated mechanism for controlling the circulation of refrigerant through the evaporator means, the combination of, first switch means, thermostatic control means responsive to the temperature of the medium being cooled for closing the first switch means when the temperature thereof increases to a predetermined high value and for opening the first switch means when the temperature thereof decreases to a predetermined low value, second switch means, control means responsive to the temperature of the evaporator means for closing the second switch means when the evaporator temperature increases to a predetermined high value, means for completing a circuit through the first and second switch means and the mechanism to cause circulation of refrigerant through the evaporator means, a heater for locally heating the thermostatic control means, and means for completing a circuit through the heater and the second switch means to cause the temperature of the thermostatic control means to assume said predetermined high value to start circulation of refrigerant through the evaporator means.

23. In a control system for a refrigerating apparatus having evaporator means for cooling a medium and an electrically operated mechanism for controlling the circulation of refrigerant through the evaporator means, the combination of, first switch means, thermostatic control means responsive to the temperature of the medium being cooled for closing the first switch means when the temperature thereof increases to a predetermined high value and for opening the first switch means when the temperature thereof decreases to a predetermined low value, second and third switch means, means responsive to the temperature of the evaporator means for closing the second switch means when the evaporator temperature increases to a predetermined high value and for opening the third switch means when the evaporator temperature decreases to a predetermined low value, means for completing a circuit through the first and third switch means and the mechanism to cause circulation of refrigerant through the evaporator means when both switch means are closed, a heater for locally heating the thermostatic control means, and means for completing a circuit through the second switch means and the heater when the second switch means is closed to cause the temperature of the thermostatic control means to assume said predetermined high value to start circulation of refrigerant through the evaporator means.

24. In a control system for a refrigerating apparatus having evaporator means for cooling a medium and an electrically operated mechanism for controlling the circulation of refrigerant through the evaporator means, the combination of, first switch means, thermostatic control means responsive to the temperature of the medium being cooled for closing the first switch means when the temperature thereof increases to a predetermined high value and for opening the first switch means when the temperature thereof decreases to a predetermined low value, second and third switch means, means responsive to the temperature of the evaporator means and the pressure on the high pressure side of the refrigerating apparatus for closing the second switch means only when the evaporator temperature increases to a predetermined high value and the pressure on the high pressure side decreases to a predetermined low value and for opening the third switch means when either the evaporator temperature decreases to a predetermined low value or the pressure on the high pressure side increases to a predetermined high value, means for completing a circuit through the first and third switch means and the mechanism to cause circulation of refrigerant through the evaporator means when both switch means are closed, a heater for locally heating the thermostatic control means, and means for completing a circuit through the second switch means and the heater when the second switch means is closed to cause the temperature of the thermostatic control means to assume said predetermined high value to start circulation of refrigerant through the evaporator means.

ALWIN B. NEWTON.